United States Patent
Yoo

(10) Patent No.: US 6,181,538 B1
(45) Date of Patent: Jan. 30, 2001

(54) COMPRESSOR CONTROL DEVICE FOR REFRIGERATOR AND METHOD THEREOF

(75) Inventor: Han-Ju Yoo, Kwangju (KR)

(73) Assignee: SamSung Electronics Co., Ltd., Suwon (KR)

(*) Notice: Under 35 U.S.C. 154(b), the term of this patent shall be extended for 0 days.

(21) Appl. No.: 09/253,023

(22) Filed: Feb. 19, 1999

(51) Int. Cl.$^7$ ................................................ H02H 7/00
(52) U.S. Cl. ........................... 361/22; 361/23; 361/78
(58) Field of Search ......................... 361/22, 23, 78; 62/129, 158

(56) References Cited

U.S. PATENT DOCUMENTS

| | | | |
|---|---|---|---|
| 3,583,173 | * 6/1971 | Chesebro | 62/158 |
| 4,912,936 | * 4/1990 | Denpou | 62/158 |
| 5,491,978 | * 2/1996 | Young et al. | 62/126 |
| 5,493,868 | * 2/1996 | Kikuiri et al. | 62/129 |

FOREIGN PATENT DOCUMENTS 55-15106   9/1980   (JP) .

* cited by examiner

Primary Examiner—Michael J. Sherry
(74) Attorney, Agent, or Firm—Robert E. Bushnell, Esq.

(57) ABSTRACT

A compressor control device for a refrigerator and a method thereof sense a momentary power failure by comparing a set revolutions per minute with an operation revolutions per minute, and control an on/off operation of the compressor according to a compressor driving state after a power comeback or during a power failure duration when occurring a momentary power failure, thereby protecting the compressor. The compressor control device includes: a revolutions per minute sensor for sensing an operation revolutions per minute of the compressor; and a controller which determines a momentary power failure by comparing the operation revolutions per minute sensed by the revolutions per minute sensor with a set revolutions per minute, and controls an on/off operation of the compressor according to a compressor driving state after a power comeback or during a power failure duration when occurring a momentary power failure. A compressor control method includes the steps of: (a) identifying a momentary power failure by comparing an operation revolutions per minute of the compressor with a set revolutions per minute; (b) determining whether a power failure duration is beyond a first set time; (c) turning off the compressor, if the power failure duration is determined to be beyond the first set time in the step (b); and (d) sensing a compressor driving state during a second set time if the power failure duration is below the first set time in the step (b), and turning on and off the compressor according to the sensed compressor driving state.

15 Claims, 6 Drawing Sheets

COMPRESSOR CONTROL DEVICE FOR REFRIGERATOR AND METHOD THEREOF

BACKGROUND OF THE INVENTION

1. Technical Field

The present invention relates to a compressor control device for a refrigerator and a method thereof More particularly, it relates to a compressor control device for a refrigerator and a method thereof, which sense a momentary power failure.

2. Related Art

A refrigerator includes a converter for converting an alternating current (AC) power to a direct current (DC) power, a power-supply unit which receives the direct current power from the converter and converts the direct current power to first and second direct current voltages, and a controller which receives the first direct current voltage from the power-supply unit and determines an operation frequency of a compressor according to a refrigerating compartment condition and a freezing compartment condition and generates a control signal.

In operation, if a power voltage is suddenly turned off during a normal operation and is then turned on, a power applied to a compressor becomes reduced during a power failure duration, thereby lowering revolutions per minute (rpm) of the compressor. In other words, if a momentary power failure occurs, a power applied to a compressor becomes reduced during the power failure duration, thereby lowering revolutions per minute of the compressor.

For example, if the power failure is maintained during 500 milliseconds (msec), the compressor revolutions per minute (rpm) drops from 3600 rpm before the power failure to 2000 rpm. Under this condition, if the power is provided again to the compressor, overcurrent is applied to the compressor, so that the compressor may be damaged.

In more detail, the compressor nearly maintains a normal revolutions per minute by inertia during a short time period after the power failure, but quickly drops its revolutions per minute if the time period after the power failure continues. Accordingly, if the power is provided again under the condition that the compressor nearly maintains the normal revolutions per minute, the compressor is not damaged. However, if the power failure time extends beyond the short time period, the revolutions per minute of the compressor becomes considerably lower than the normal revolutions per minute. In this case, if the power is provided again to the compressor, overcurrent is applied to the compressor, thereby possibly causing the compressor to become damaged.

I have found that the aforementioned refrigerator cannot effectively protect the compressor when the power failure occurs. Efforts have been made to improve refrigerators. For example, there exists a Japanese Patent Unexamined Publication No. sho 56-113969, published on Sep. 8, 1981 (hereinafter Japanese Patent '969).

While Japanese Patent '969 provides advantages, I note that it fails to adequately provide a compressor control device for a refrigerator, and method thereof, which efficiently and conveniently protects the compressor without an unnecessary delay of a power-on time.

SUMMARY OF THE INVENTION

Accordingly, the present invention is directed to a compressor control device for a refrigerator and a method thereof that substantially obviate one or more of the problems due to limitations and disadvantages of the related art.

It is an object of the present invention to provide a compressor control device for a refrigerator, and a method thereof, which sense a momentary power failure by comparing a set revolutions per minute with an operation revolutions per minute, and control an on/off operation of the compressor according to a compressor driving state after a power comeback, thereby protecting the compressor.

It is a further object of the present invention to provide a compressor control device for a refrigerator, and a method thereof, which sense a momentary power failure by comparing a set revolutions per minute with an operation revolutions per minute, and control an on/off operation of the compressor according to a compressor driving state during a power failure duration occurring due to a momentary power failure, thereby protecting the compressor.

To achieve the above objects and others, in a refrigerator including a converter for converting an alternating current power to a direct current power, an inverter for converting the direct current power to 3-phase alternating current power, and a compressor driven by the 3-phase alternating current power, a compressor control device for the refrigerator includes: a revolutions per minute sensing means for sensing an operation revolutions per minute of the compressor; and a control means which determines a momentary power failure by comparing the operation revolutions per minute sensed by the revolutions per minute sensing means with a set revolutions per minute, and controls an on/off operation of the compressor according to a compressor driving state after a power comeback or during a power failure duration when occurring a momentary power failure.

To achieve these and other objects in accordance with the principles of the present invention, as embodied and broadly described, the present invention provides a method for controlling a compressor of a refrigerator including a converter for converting an alternating current power to a direct current power, an inverter for converting the direct current power to 3-phase alternating current power, and a compressor driven by the 3-phase alternating current power, includes the steps of: (a) determining a momentary power failure by comparing an operation revolutions per minute of the compressor with a set revolutions per minute; (b) if the step (a) determines a momentary power failure, determining whether a power failure duration is beyond a first set time; (c) if the power failure duration is beyond the first set time in the step (b), turning off the compressor; and (d) if the power failure duration is below the first set time in the step (b), sensing a compressor driving state during a second set time, and turning on and off the compressor according to the sensed compressor driving state.

To achieve these and other objects in accordance with the principles of the present invention, as embodied and broadly described, the present invention provides an apparatus, comprising: a compressor receiving a first substance uncompressed and outputting said first substance compressed, said compressor being driven by a primary power; a sensing unit sensing revolutions per minute of said compressor; and a power controller detecting a difference between said revolutions per minute of said compressor and a predetermined quantity of revolutions per minute, said power controller performing one of supplying said primary power to said compressor and cutting off said primary power to said compressor according to said difference detected.

To achieve these and other objects in accordance with the principles ofthe present invention, as embodied and broadly described, the present invention provides a method controlling a compressor of a refrigerator including a converter converting an alternating current power to a direct current power, an inverter converting said direct current power to a three-phase alternating current power, and a compressor driven by said three-phase alternating current power, comprising: detecting a power failure by comparing revolutions per minute of said compressor with a predetermined quantity of revolutions per minute; determining when a duration of said power failure extends beyond a first predetermined quantity of time, when said power failure is detected; first cutting off power to said compressor, when said duration of said power failure extends beyond said first predetermined quantity of time; and second cutting off power to said compressor according to a compressor status sensed during a second predetermined quantity oftime, when said duration of said power failure does not extend beyond said first predetermined quantity of time.

To achieve these and other objects in accordance with the principles of the present invention, as embodied and broadly described, the present invention provides a method controlling a compressor of a refrigerator, comprising: determining when said compressor is receiving primary power; sensing revolutions per minute of said compressor, and determining when said sensed revolutions per minute of said compressor reach a first predetermined quantity of revolutions per minute; detecting when a difference between said revolutions perminute of said compressor and said first predetermined quantity of revolutions per minute exceeds a second predetermined quantity of revolutions per minute; when said difference is maintained during a first predetermined quantity of time, cutting off said primary power to said compressor; and when said difference is not maintained during said first predetermined quantity of time and when a fluctuation is repeated a predetermined quantity of occasions during a second predetermined quantity of time, cutting off said primary power to said compressor, said fluctuation corresponding to said revolutions perminute of said compressor being above said first predetermined quantity of revolutions per minute and then being below said first predetermined quantity of revolutions per minute.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DETAILED DESCRIPTION OF THE PREFERRED EMBODIMENT

While the present invention will be described more fully hereinafter with reference to the accompanying drawings, in which a preferred embodiment of the present invention is shown, it is to be understood at the outset ofthe description which follows that persons of skill in the appropriate arts may modify the invention here described while still achieving the favorable results of this invention. Accordingly, the description which follows is to be understood as being abroad, teaching disclosure directed to persons of skill in the appropriate arts, and not as limiting upon the present invention.

Figure 1:
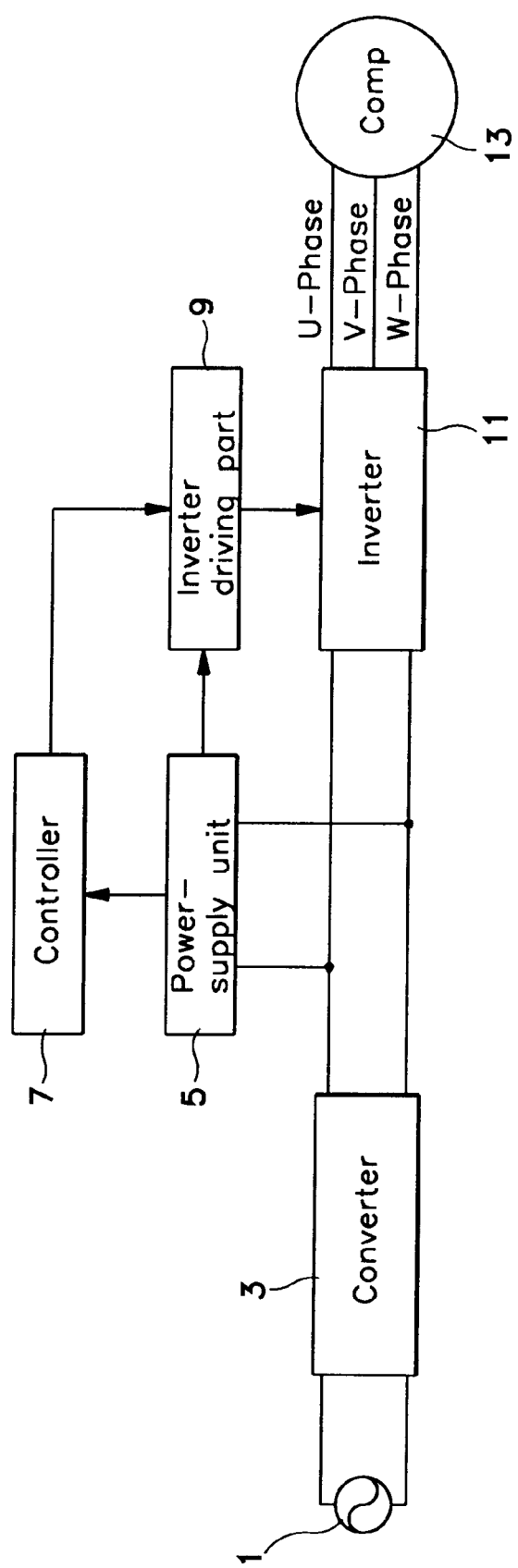
FIG. 1 is a block diagram showing a compressor control device of a refrigerator.

An inverter refrigerator will now be described with reference to FIGS. 1 and 2. The FIG. 1 is a block diagram showing a compressor control device of a refrigerator. The FIG. 2 is a detailed circuit diagram of a compressor driving circuit of a refrigerator.

Figure 2:
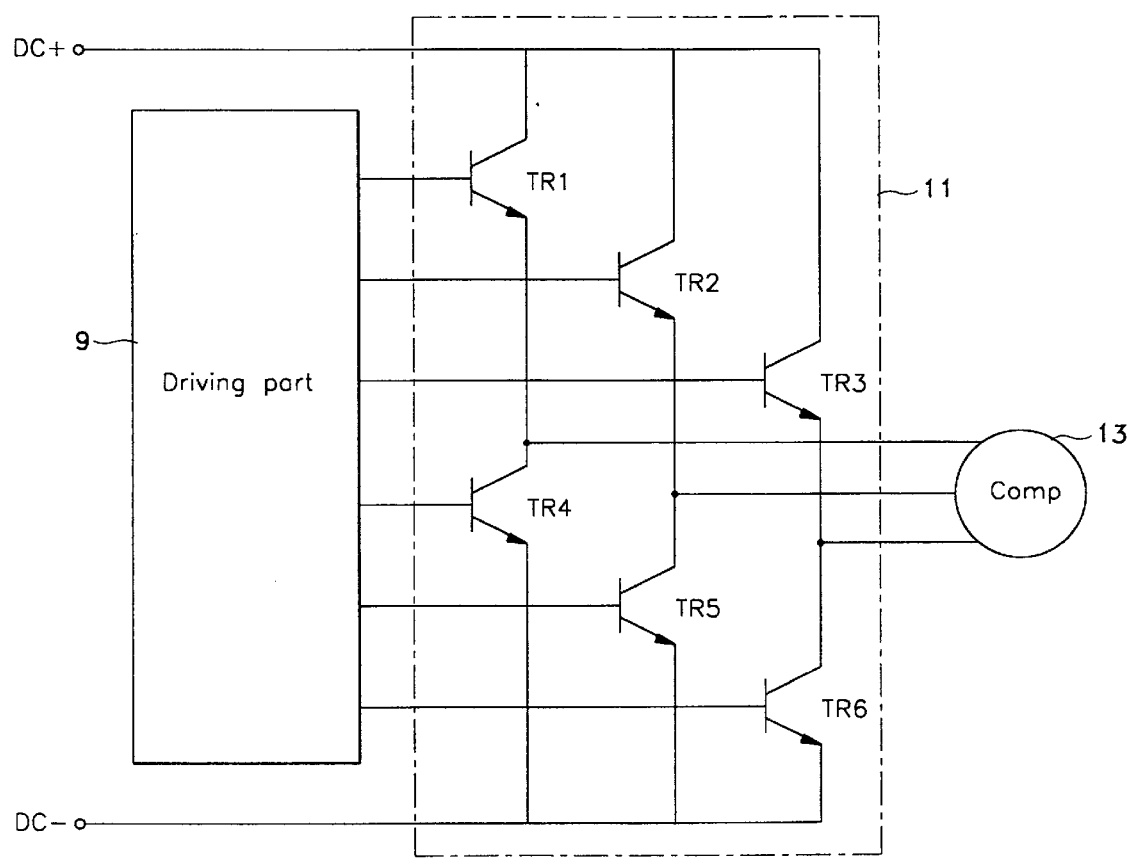
FIG. 2 is a detailed circuit diagram of a compressor driving circuit of a refrigerator.

As shown in FIG. 1, the refrigerator includes: a converter 3 for converting an alternating current (AC) power 1 to a direct current (DC) power; a power-supply unit 5 which receives the direct current power from the converter 3, and converts the direct current power to first and second direct current voltages; a controller 7 which receives the first direct current voltage (i.e., 5 volts) from the power-supply unit 5, determines an operation frequency of a compressor 13 according to a refrigerating compartment condition and a freezing compartment condition, and generates a control signal; aninverter driving part 9 which receives the second direct current voltage (i.e., 12 volts) from the power-supply unit 5 and the control signal from the controller 7, and amplifies the control signal as an inverter driving signal in order to make the compressor 13 be driven according to the operation frequency determined by the controller 7; and an inverter 11 which turns on or off six power transistors TR1, TR2, TR3, TR4, TR5, and TR6 shown in FIG. 2 after receiving the inverter driving signal from the inverter driving part 9, and converts the direct current power generated from the converter 3 to 3-phase (U-phase, V-phase, and W-phase) alternating current power. The compressor 13 is finally driven by the 3-phase alternating current power.

In operation, if a power voltage is suddenly turned off during a normal operation and is then turned on (that is, if a momentary power failure occurs), a power applied to a compressor 13 becomes reduced during a power failure duration, thereby lowering an revolutions per minute of the compressor 13.

For example, if the power failure is maintained during 500 msec, the compressor revolutions per minute drops from 3600 revolutions per minute before the power failure to 2000 revolutions per minute below. Under this condition, if the power is provided again to the compressor 13, overcurrent is applied to the compressor 13, so that the compressor 13 may be damaged.

In more detail, the compressor 13 nearly maintains abnormal revolutions per minute by inertia during a short time after the power failure, but quickly drops its revolutions per minute if the short time elapses. Accordingly, if the power is provided again under the condition that the compressor 13 nearly maintains the normal revolutions per minute, the compressor 13 is not damaged. However, if the power failure time becomes longer than the short time, an operation revolutions per minute of the compressor 13 becomes considerably lowered than the normal revolutions per minute.

In this case, if the power is provided again to the compressor 13, overcurrent is applied to the compressor 13, thereby the compressor 13 may be broken. In conclusion, I have found that the aforementioned refrigerator cannot effectively protect the compressor when the power failure occurs.

Reference will now be made in detail to the preferred embodiments of the present invention, examples of which are illustrated in the accompanying drawings, FIGS. 3 through 6. The FIG. 3 is a block diagram showing a compressor control device of a refrigerator according to the present invention.

Figure 3:
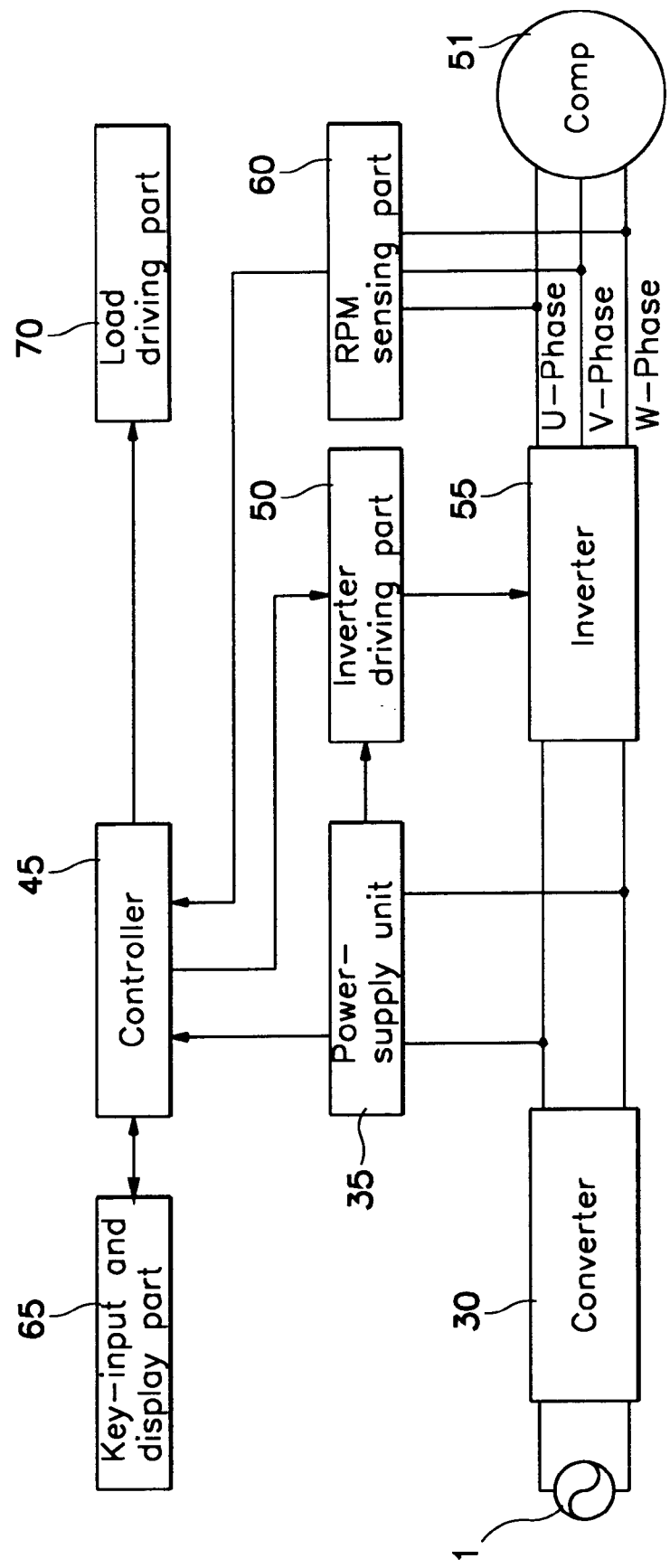
FIG. 3 is a block diagram showing a compressor control device of a refrigerator, in accordance with the principles of the present invention.

Referring to FIG. 3, a converter 30 converts an alternating current (AC) input power 1 to a direct current (DC) power. A power-supply unit 35 is a switching mode power supply (SMPS) which receives the direct current power as an input and converts the direct current power to first and second direct current voltages (i.e., a controller driving power of direct current 5 volts, and a load driving power of direct current 12 volts).

A controller 45 receives the first direct current voltage (i.e., direct current 5 volts) generated from the power supply unit 35, initializes the refrigerator, determines an optimum operation frequency of a compressor 51 according to a freezing compartment condition and a refrigerating compartment condition, and generates a pulse width modulation (PWM) signal.

The inverter driving part 50 receives the second direct current voltage (direct current 12 volts) from the power supply unit 35, and amplifies the power width modulation (PWM) signal as an inverter driving signal in order to make the compressor 51 rotate according to the operation frequency determined by the controller 45.

The inverter 55 turns on or off six power transistors (TR1, TR2, TR3, TR4, TR5, and TR6 shown in FIG. 2) according to the driving signal generated from the inverter driving part 50, converts the direct current power generated from the converter 30 to 3-phase (U-phase, V-phase, and W-phase) alternating current power, and outputs the 3-phase alternating current power to the compressor 51.

A key-input and display part 65 receives a compartment temperature and an operation condition from a user, and displays a set temperature, a compartment temperature, and an operation state. A load driving part 70 controls a driving of loads (e.g., freezing compartment fan, a refrigerating compartment fan, and a heater, etc.) according to a control signal generated from the controller 45.

A revolutions per minute (rpm) sensor 60 senses an operation revolutions per minute of the compressor 51 rotating by the 3-phase alternating current power generated from the inverter 55. The controller 45 receives the operation revolutions per minute sensed by the revolutions per minute sensor 60, determines a momentary power failure by comparing the sensed operation revolutions per minute with a set revolutions per minute, senses a compressor driving state during a counted power failure duration or after a power comeback in case that the momentary power failure occurs, and thus controls a driving of the compressor 51.

Figure 4:
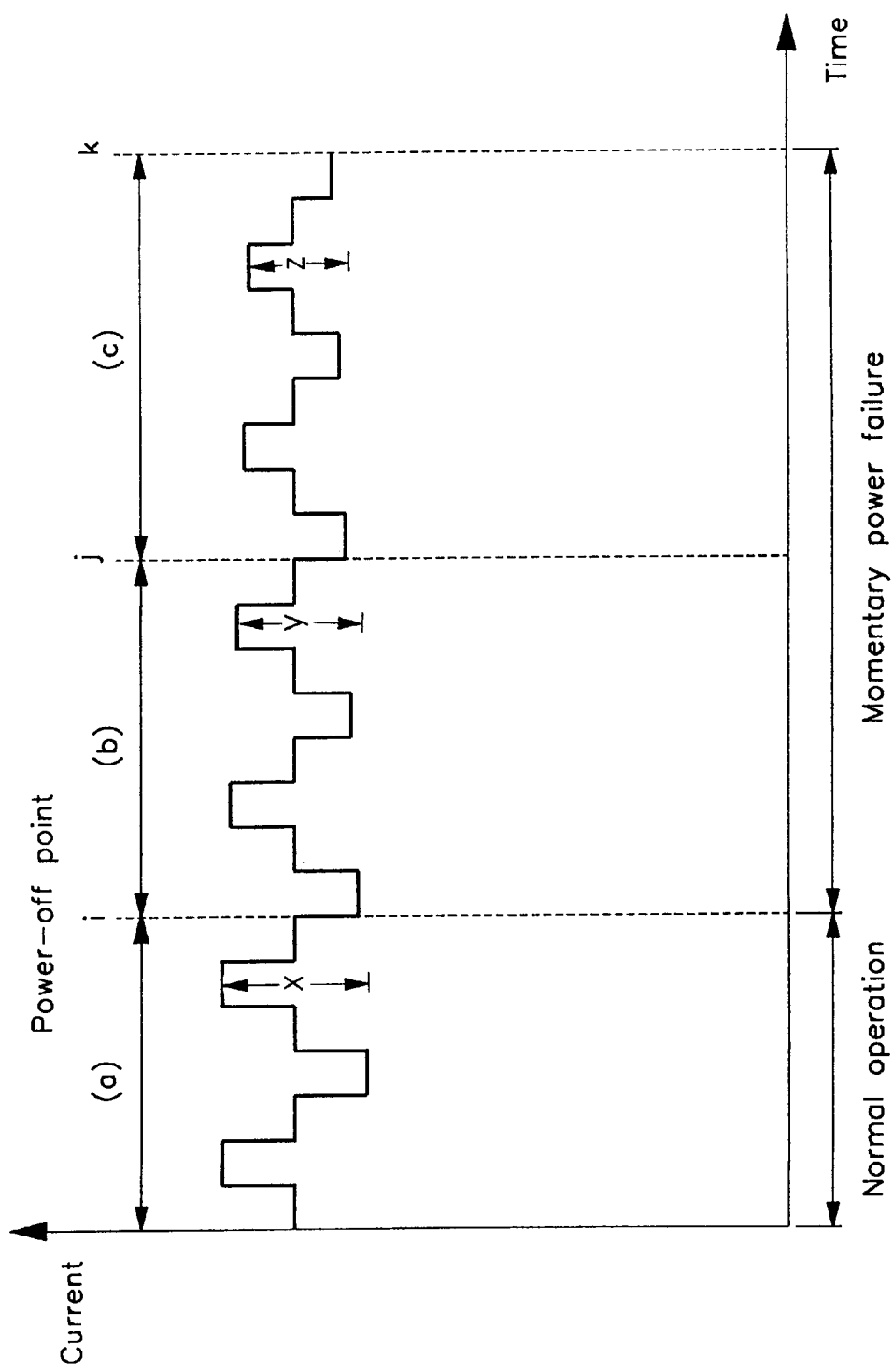
FIG. 4 illustrates current waveforms applied to a compressor when a momentary power failure occurs.
Figure 5:
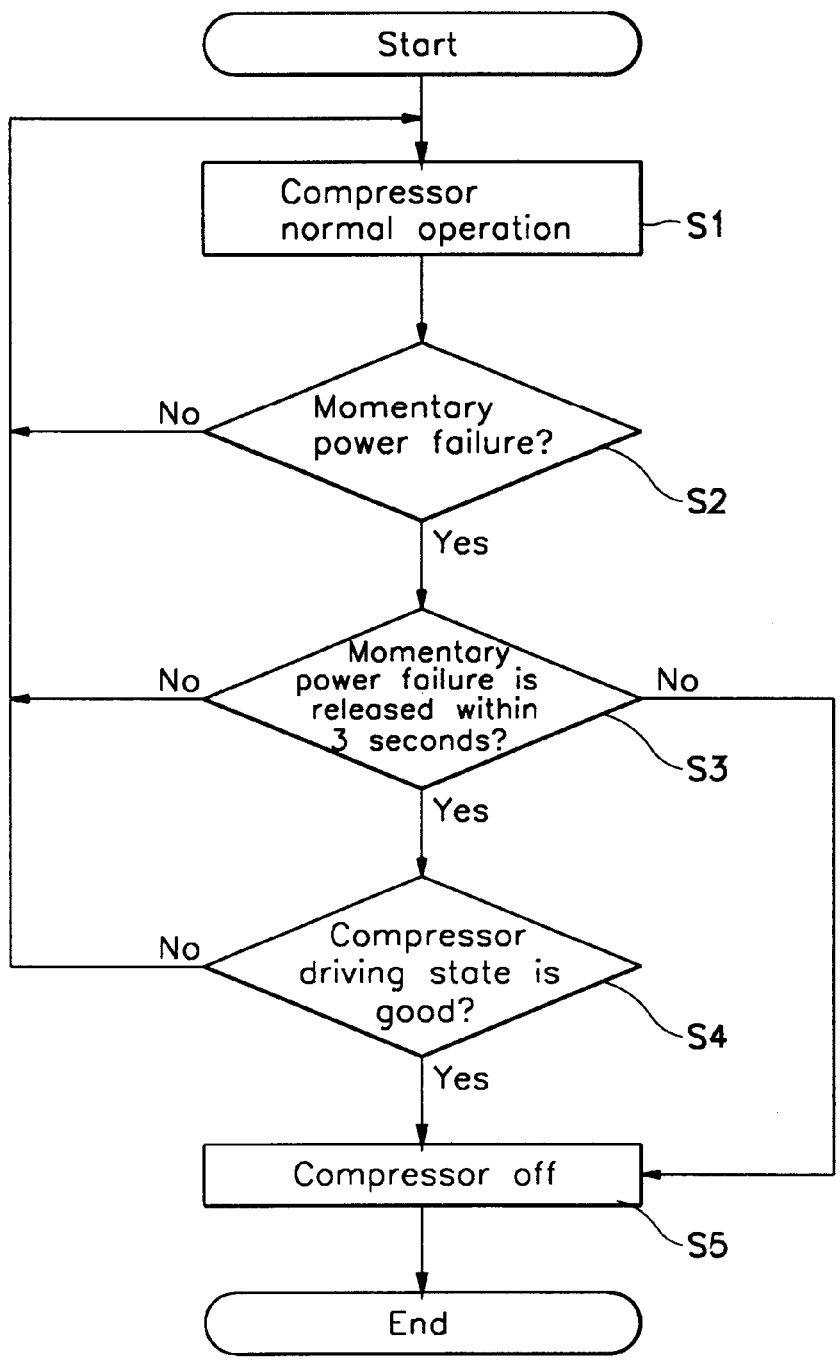
FIG. 5 is a flowchart showing a compressor control method when a momentary power failure occurs, in accordance with the principles of the present invention.
Figure 6:
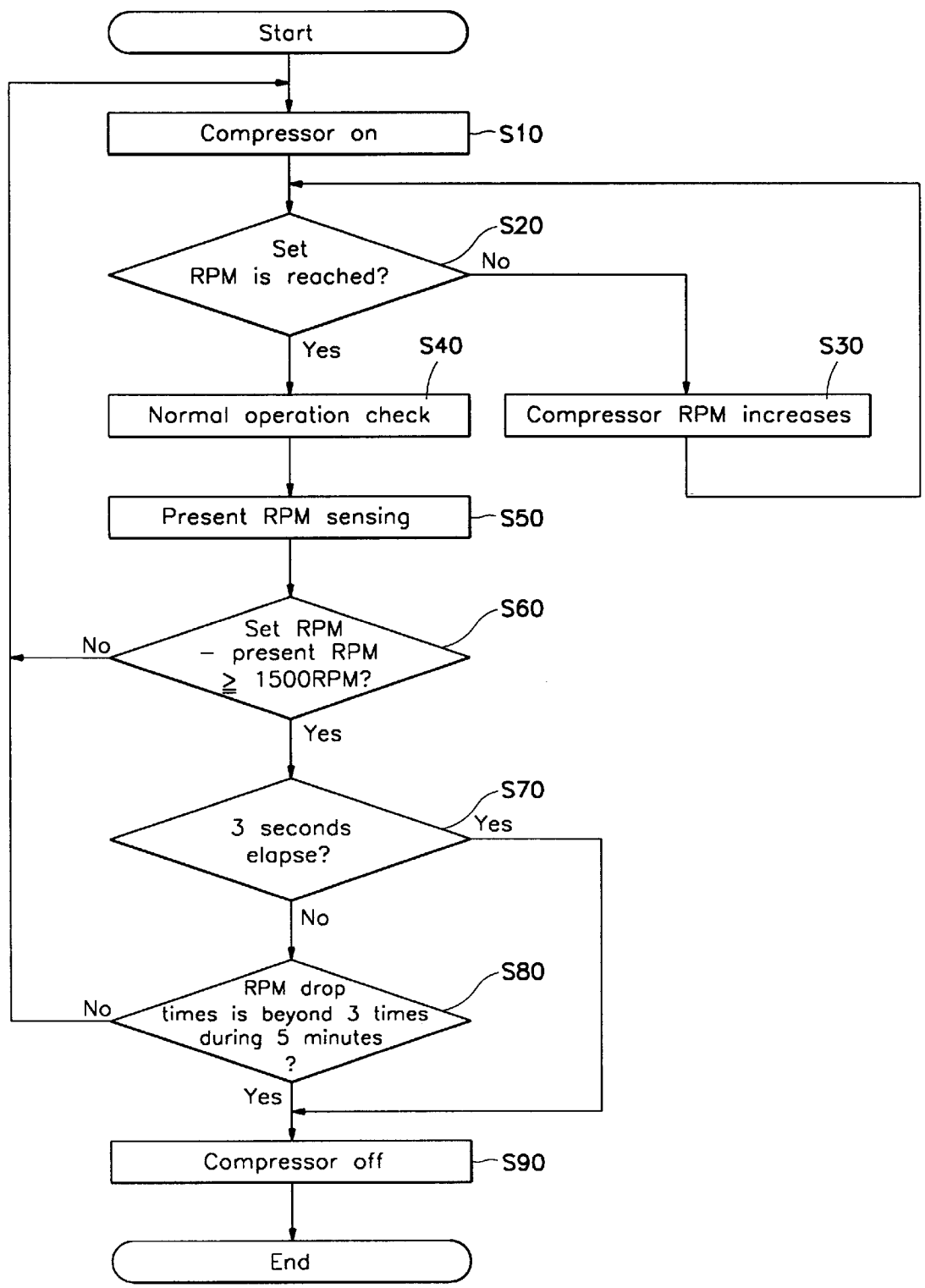
FIG. 6 is a flowchart more specifically showing a compressor control method when a momentary power failure occurs, in accordance with the principles of the present invention.

Operations of the above compressor control device will be described with reference to the FIGS. 4–6. The FIG. 4 illustrates current waveforms applied to a compressor when a momentary power failure occurs. The FIG. 5 is a flowchart showing a compressor control method when a momentary power failure occurs, according the present invention. The FIG. 6 is a flowchart more specifically showing a compressor control method when a momentary power failure occurs, according to the present invention.

FIG. 4 shows variations in electrical current in relationship to time. Refer now to FIG. 4. In the FIG. 4, a first period of time (a) indicates that a compressor is driven normally before a power failure. A symbol (i) indicates a power-failure starting time, that is, a power-off time. A second period of time (b) indicates that the compressor's normal revolutions per minute are nearly maintained by inertia after the power failure. A third time period (c) indicates that the compressor's revolutions per minute drops more because a power comeback is delayed after the power failure.

As shown in FIG. 4, the value of X is greater than the value of Y. As shown in FIG. 4, the value of Y is greater than the value of Z. Therefore, the revolutions per minute of the compressor 51 are at an operational level during period (a). The revolutions per minute of the compressor 51 are slightly lower than the operational level during period (b). The revolutions per minute of the compressor 51 are much lower than the operational level during period (c).

Here, if a power comeback (or power-on) is achieved in the period (b), the compressor can be driven without suffering damage. However, if the power comeback is achieved in the period (c) and is applied to the compressor, the compressor may be damaged due to the fact that the revolutions per minute have been considerably lowered.

Accordingly, according to the power comeback point, that is, during period (b) or period (c), a compressor control method should be changed. Such a compressor control method will be described with reference to FIG. 5, in accordance with the principles of the present invention.

In FIG. 5, at step S1, the controller 45 checks whether the compressor 51 is normally driven or not by using a compressor operation revolutions per minute sensed by the revolutions per minute sensor 60. At step S2, if the compressor 51 is normally driven in the step S1, the controller 45 determines whether or not a momentary power failure occurs by continuously sensing a present revolutions per minute of the compressor 51. At step S3, if the step S2 determines the momentary power failure, the controller 45 determines whether a power failure duration counted by an inner timer (not shown) is beyond a set time, for example, 3 seconds.

At step S5, if the step S3 determines that the power failure duration is beyond the set time, that is, 3 seconds, this condition means that a compressor driving state is reached to the period (c) of FIG. 4, so that the controller 45 compulsorily turns off the compressor 51.

However, if the power failure duration is below 3 seconds in the step S3, this condition means that a compressor driving state is reached to the period (b) of FIG. 4. At step S4, therefore, in order to determine a re-operation of the compressor 51, the controller 45 determines whether the compressor driving state is good or not by using a compressor revolutions per minute during a predetermined time.

If the compressor driving state is good in the step S4, then the step S1 is performed. If the compressor driving state is not good in the step S4, the compressor 51 is compulsorily turned off at step S5.

The above compressor control method will be describedinmore detail with reference to FIG. 6, in accordance with the principles of the present invention. In FIG. 6, at step S10, the compressor is turned on. If the compressor is turned on, then the controller 45 performs step S20. At step S20, a revolutions per minute (rpm) sensor 60 senses a present revolutions per minute of the compressor 51, the controller 45 determines whether the present revolutions per minute ofthe compressor 51 has reached to a set revolutions per minute.

Step S30 is performed if the present revolutions per minute of the compressor 51 have not reached the set revolutions per minute in the step S20. At step S30, the controller 45 outputs a power width modulation (PWM) signal to the inverter driving part 50 in order to allow a compressor's revolutions per minute to be increased to the set revolutions per minute.

Step S40 is performed if the present revolutions per minute of the compressor 51 have reached the set revolutions per minute in the step S20. The step S40 confirms a normal operation of the compressor 51 by continuously checking the compressor's revolutions per minute. That is, after the compressor's revolutions per minute have reached the set revolutions per minute, the step S40 determines a compressor 51's normal driving by checking whether the compressor 51 rotates within an allowable range regarded as a normal driving of the compressor 51. The step S40 checks whether a real operation revolutions per minute of the compressor 51 is present within a predetermined range centering around the set revolutions per minute. Accordingly, the step S40 solves a problem that an error is determined while the compressor 51's revolutions per minute is reached to the set revolutions per minute after the compressor 51 is initially driven.

At step S50, next, a present revolutions per minute of the compressor 51 is sensed by the revolutions per minute sensor 60. At step S60, a determination is made as to whether a difference between the sensed present revolutions per minute and the set revolutions per minute is greater than or equal to 1500 revolutions per minute. If the difference between the sensed present revolutions per minute and the set revolutions per minute is not above 1500 revolutions per minute in the step S60, this condition means that a power voltage of the alternating current power source 1 continuously maintains an on-state, so that the controller 45 determines that a momentary power failure is not generated, and thus returns to the step S10.

However, if the difference between the present revolutions per minute and the set revolutions per minute is determined to be above 1500 revolutions per minute at step S60, this condition means that a power voltage of the alternating current power source 1 is at an off-state, so that the compressor revolutions per minute are gradually lowered as shown in the momentary power failure periods (b) and (c) of FIG. 4.

In FIG. 6, at step S70, if the difference between the set revolutions per minute and the present revolutions per minute is beyond 1500 revolutions per minute, a determination is made as to whether this state is maintained over 3 seconds, meaning an entire time of the period (b) of FIG. 4. In other words, at step S70, the controller 45 determines whether a power failure duration counted by an inner timer is over the predetermined time, that is, 3 seconds. At step S80, if the power failure duration is determined to be over 3 seconds in step S70, this condition means that a compressor driving state has reached a condition corresponding to the period (c) of FIG. 4, so that the controller 45 compulsorily turns off the compressor 51.

If the power failure duration is determined to be below 3 seconds in step S70, this condition means that a power comeback is achieved in the period (b) of FIG. 4, so that the compressor 51 does not need to be unconditionally turned off. At step S80, accordingly, in order to determine a re-operation of the compressor 51, a determination is made as to whether the compressor driving state is good during a predetermined time, that is, 5 minutes.

If the power failure duration does not elapse 3 seconds in the step S70, this condition means that a present revolutions per minute of the compressor returns to the set revolutions per minute. In this case, in order to determine a re-operation of the compressor 51, a step S80 determines whether the revolutions per minute drop times (at which a difference between the present revolutions per minute and the set revolutions per minute is beyond 1500 revolutions per minute) is beyond 3 times during 5 minutes. If the revolutions per minute drop times are below 3 times during 5 minutes in the step S80, this condition means that a compressor driving state is good, thus the step S10 is performed.

However, if the revolutions per minute drop times are beyond 3 times during 5 minutes in the step S80, this condition means that a compressor driving state is unstable, so that the step S80 determines that the compressor driving state is not good. Therefore, the compressor is compulsorily turned off in the step S90.

In the preferred embodiment of the present invention, 3 seconds being set as a power failure duration and 5 minutes being a compressor driving state checking time can be readily modified by those skilled in the art. For example, in case of a momentary power failure, if the overcurrent is applied to the compressor 51 at a time point 500 milliseconds (msec), the user obtains a compressor revolutions per minute at the time point 500 milliseconds and can adjust the set time and the revolutions per minute drop times as he or she wishes.

As described above, the present invention senses a momentary power failure by comparing a set revolutions per minute with an operation revolutions per minute, and controls an on/off operation of the compressor according to a compressor driving state after a power comeback or during a power failure duration when occurring a momentary power failure, thereby protecting the compressor. In other words, the present invention senses a present revolutions per minute of the compressor on the basis of the set revolutions per minute. After the present revolutions per minute is reached to the set revolutions per minute, if the present revolutions per minute suddenly drops below a predetermined revolutions per minute based on the set revolutions per minute, controls an on/off operation of the compressor according to the compressor driving state, prevents that overcurrent is applied to the compressor, thereby protecting the compressor.

The foregoing paragraphs describe the details of the present invention as it relates to a compressor control device for a refrigerator and a method thereof, which sense a momentary power failure by comparing a set revolutions per minute (revolution per minute) with an operation revolutions per minute, and control an on/off operation of the compressor according to a compressor driving state after a power comeback or during a power failure duration when occurring a momentary power failure, thereby protecting the compressor.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. An apparatus, comprising:

a compressor receiving a first substance uncompressed and outputting said first substance compressed, said compressor being driven by a primary power;

a sensing unit sensing revolutions per minute of said compressor; and a power controller detecting a difference between said revolutions per minute of said compressor and a predetermined quantity of revolutions per minute, said power controller performing one of supplying said primary power to said compressor and cutting off said primary power to said compressor according to said difference detected, said power controller cutting off said primary power to said compressor when said revolutions per minute of said compressor correspond to a first quantity of revolutions per minute above said predetermined quantity of revolutions per minute and then decrease to correspond to a second quantity of revolutions per minute below said predetermined quantity of revolutions per minute and then stay below said predetermined quantity of revolutions per minute for a predetermined quantity of time.

2. An apparatus, comprising:

a compressor receiving a first substance uncompressed and outputting said first substance compressed, said compressor being driven by a primary power;

a sensing unit sensing revolutions per minute of said compressor; and a power controller detecting a difference between said revolutions per minute of said compressor and a predetermined quantity of revolutions per minute, said power controller performing one of supplying said primary power to said compressor and cutting off said primary power to said compressor according to said difference detected, said power controller cutting off said primary power to said compressor when said revolutions per minute of said compressor correspond to a first range of revolutions per minute above said predetermined quantity of revolutions per minute and then decrease to correspond to a second range of revolutions per minute below said predetermined quantity of revolutions per minute and then continue to correspond to said second range of revolutions per minute during a predetermined quantity of time.

3. An apparatus, comprising:

a compressor receiving a first substance uncompressed and outputting said first substance compressed, said compressor being driven by a primary power;

a sensing unit sensing revolutions per minute of said compressor; and a power controller detecting a difference between said revolutions per minute of said compressor and a predetermined quantity of revolutions per minute, said power controller performing one of supplying said primary power to said compressor and cutting off said primary power to said compressor according to said difference detected, said power controller cutting off said primary power to said compressor when said revolutions per minute of said compressor increase to correspond to a first range of revolutions per minute above said predetermined quantity of revolutions per minute and subsequently decrease to correspond to a second range of revolutions per minute below said predetermined quantity of revolutions per minute, said increase and said subsequent decrease being repeated a predetermined quantity of occasions during a predetermined quantity of time.

4. An apparatus, comprising:

a compressor receiving a first substance uncompressed and outputting said first substance compressed, said compressor being driven by a primary power;

a sensing unit sensing revolutions per minute of said compressor; and a power controller detecting a difference between said revolutions per minute of said compressor and a predetermined quantity of revolutions per minute, said power controller performing one of supplying said primary power to said compressor and cutting off said primary power to said compressor according to said difference detected, said power controller cutting off said primary power to said compressor when said revolutions per minute of said compressor increase to correspond to a first quantity of revolutions per minute above said predetermined quantity of revolutions per minute and subsequently decrease to correspond to a second quantity of revolutions per minute below said predetermined quantity of revolutions per minute, said increase and said subsequent decrease being repeated a predetermined quantity of occasions during a predetermined quantity of time.

5. A method controlling a compressor of a refrigerator including a converter converting an alternating current power to a direct current power, an inverter converting said direct current power to a three-phase alternating current power, and a compressor driven by said three-phase alternating current power, comprising:

detecting a power failure by comparing revolutions per minute of said compressor with a predetermined quantity of revolutions per minute;

determining when a duration of said power failure extends beyond a first predetermined quantity of time, when said power failure is detected;

first cutting off power to said compressor, when said duration of said power failure extends beyond said first predetermined quantity of time; and second cutting off power to said compressor according to a compressor status sensed during a second predetermined quantity of time, when said duration of said power failure does not extend beyond said first predetermined quantity of time.

6. The method of claim 5, said detecting of said power failure further comprising:

determining when said compressor is receiving power;

sensing revolutions per minute of said compressor when said compressor is receiving power, and determining when said revolutions per minute of said compressor correspond to said predetermined quantity of revolutions per minute; and said power failure being detected when a difference between said revolutions per minute of said compressor and said predetermined quantity of revolutions per minute exceeds a set value after said revolutions per minute of said compressor exceed said predetermined quantity of revolutions per minute.

7. The method of claim 6, said set value exceeding 1500 revolutions per minute.

8. The method of claim 5, said first predetermined quantity of time corresponding to a time period during which an operating speed of said compressor is maintained by inertia, said operating speed of said compressor corresponding to said revolutions perminute of said compressor when said compressor is being driven by said three-phase alternating current power.

9. The method of claim 5, said second cutting off of said power to said compressor further comprising identifying when said compressor status corresponds to a first condition, said first condition existing when a fluctuation repeatedly occurs, said fluctuation corresponding to said revolutions per minute of said compressor increasing to correspond to a first quantity of revolutions perminute above said predetermined quantity of revolutions per minute and subsequently decreasing to correspond to a second quantity of revolutions per minute below said predetermined quantity of revolutions per minute during said second predetermined quantity of time.

10. The method of claim 5, said second cutting off of said power to said compressor further comprising identifying when said compressor status corresponds to a fluctuation being repeated a predetermined quantity of occasions during said second predetermined quantity of time, said fluctuation existing when said revolutions per minute of said compressor increase to correspond to a first quantity of revolutions per minute above said predetermined quantity of revolutions per minute and subsequently decrease to correspond to a second quantity of revolutions per minute below said predetermined quantity of revolutions per minute.

11. A method controlling a compressor of a refrigerator, comprising:

determining when said compressor is receiving primary power;

sensing revolutions per minute of said compressor, and determining when said sensed revolutions per minute of said compressor reach a first predetermined quantity of revolutions per minute;

detecting when a difference between said revolutions per minute of said compressor and said first predetermined quantity of revolutions per minute exceeds a second predetermined quantity of revolutions per minute;

when said difference is maintained during a first predetermined quantity of time, cutting off said primary power to said compressor; and when said difference is not maintained during said first predetermined quantity of time and when a fluctuation is repeated a predetermined quantity of occasions during a second predetermined quantity of time, cutting off said primary power to said compressor, said fluctuation corresponding to said revolutions per minute of said compressor being above said first predetermined quantity of revolutions per minute and then being below said first predetermined quantity of revolutions per minute.

12. The method of claim 11, said detecting being performed after said revolutions per minute of said compressor reach said first predetermined quantity of revolutions per minute.

13. The method of claim 11, said second predetermined quantity of revolutions per minute being at least 1500 revolutions per minute.

14. The method of claim 12, said predetermined quantity of occasions exceeding two.

15. The method of claim 11, said first predetermined quantity of time exceeding two seconds and said second predetermined quantity of time exceeding four minutes.

* * * * *